Jan. 20, 1959     C. D. LUCAS     2,869,262

WHEEL-SUPPORTED ADVERTIZING SIGNS

Filed June 3, 1957

INVENTOR.
Charles D. Lucas
BY
ATTORNEY

United States Patent Office 2,869,262
Patented Jan. 20, 1959

2,869,262

WHEEL-SUPPORTED ADVERTIZING SIGNS

Charles D. Lucas, San Francisco, Calif.

Application June 3, 1957, Serial No. 663,121

3 Claims. (Cl. 40—129)

The present invention relates to improvements in wheel-supported advertizing signs, and its principal object is to provide a convenient means for attaching an advertizing sign to the hub cap of an automobile wheel in such a manner that the advertizing sign is held against revolving movement while the wheel rotates, and which presents its advertizing material in readable position at all times.

A further object of my invention is to provide an anchoring means or adapter for the sign centrally of the hub cap and arranged in such a manner that it takes up little space for accommodation in relatively small tolerances between the cap and an axle extending into the same.

It is further proposed to provide an anchoring means that is adapted to reinforce the central portion of the cap to allow the latter to more effectively assume the burden of carrying the advertizing sign.

It is additionally proposed to provide an anchoring means of the character described, which is easy to apply to the hub cap, easily removed, and still may remain in place permanently whether the sign is used or not.

It is a still further object of the invention to provide a very simple means for securing the sign upon the anchoring means which allows the sign to be applied or removed at an instant's notice.

This feature is of considerable importance where the sign is to be used for temporary purposes only, as in an election campaign, or for big games and similar events, provision being made that upon removal of the sign, the anchoring means may be easily covered so as to leave no trace of its presence.

Further objects and advantages of my invention will be apparent as the specification proceeds, and the new and useful features of the same will be fully defined in the claims attached hereto.

Figure 3:
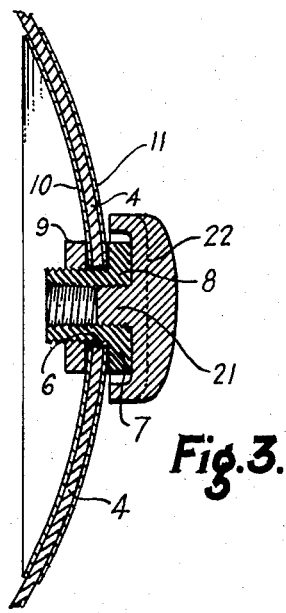
Figure 2:
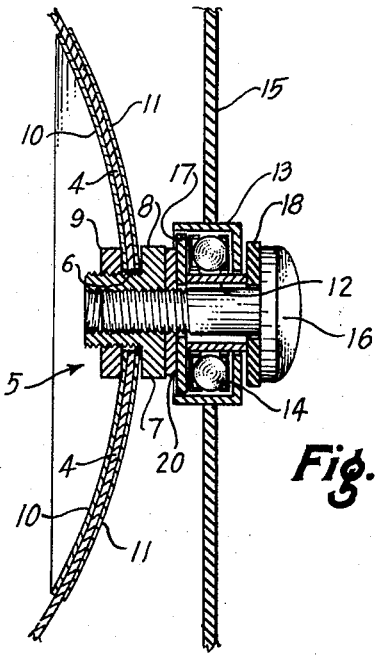
Figure 1:
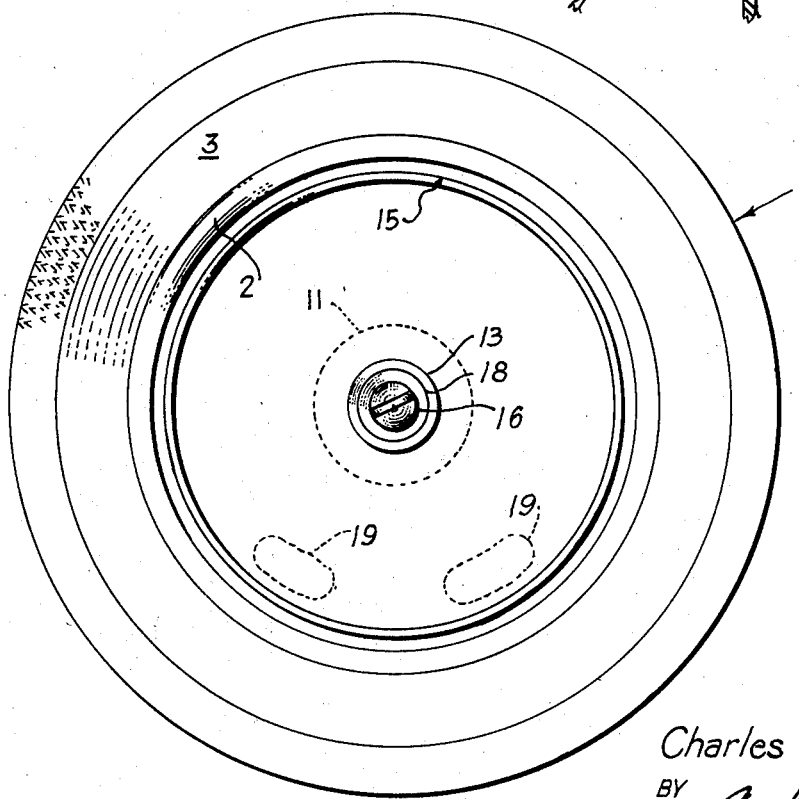

The preferred form of my invention is illustrated in the accompanying drawing forming part of this application, in which:

Figure 1 shows a side view of an automobile wheel having my sign attached thereto;

Figure 2, an axial section through the hub cap and sign assembly, on an enlarged scale, as compared with Figure 1; and Figure 3, a similar axial section, with a closure cap substituted for the advertizing sign.

While I have shown only the preferred form of my invention, it should be understood that various changes or modifications may be made within the scope of the claims attached hereto, without departing from the spirit of the invention.

Referring to the drawing in detail, Figure 1 shows a conventional automoboile wheel 1 having an annular rim 2 on which a tire 3 is mounted and a central hub cap 4, which may be made of any desired shape, but in most automobiles now on the market is concave-convex in its central portion, with the convex face presented outwardly.

The hub is secured upon the wheel in any suitable manner, usually by means of an annular flange fitting inside the hub and held to the latter by spring fingers, not shown. It may be easily removed by prying to give access to the wheel anchoring bolts in case it is desired to change wheels.

The hub cap, of course, rotates with the wheel, and in the present invention, it is proposed to attached the advertizing sign to the hub cap in such a manner that the sign does not rotate with the wheel.

For this purpose, I provide an anchoring means generally shown at 5, which calls, in the first place, for the drilling of a central hole 6 in the hub cap. This hole is adapted to receive an adapter bolt 7 slidable in the hole, the bolt having a head 8 at the outer end, and being adapted to threadedly receive a nut 9 at its inner end.

Additionally, I provide two discs 10 and 11 between the bolt head and nut and opposite faces of the hub cap, as shown, the discs having central holes registering with the central hole in the cap.

The two discs are made to follow the contour of the central portion of the cap and will usually be made concavo-convex, because that is the shape of most hub caps.

The form may be changed, however, to register with other forms of hub caps.

The discs are considerably larger than ordinary washers, and their main function is to reinforce the central portion of the hub cap and to steady the anchoring bolt. They are sufficiently thin to take up little space, so that the inner disc and the nut 9 will be readily accommodated in the space ordinarily available for this purpose.

In assembling the anchoring means, after the hole has been drilled in the center of the hub cap, the two discs are placed on opposite faces of the cap, with the holes registering, and then the bolt is passed through the registering holes, with the bolt head on the outside, whereupon the nut 9 is applied to the inner end of the bolt for clamping the bolt head and the nut tightly upon the discs and the hub cap.

The bolt is hollow and is threaded internally to serve as anchoring means for the sign plate assembly.

The sign plate assembly comprises in its principal features a ball bearing including an inner race 12, an outer race 13 and a ball race 14 mounted between the two, means for anchoring the inner race to the hollow bolt, and a large annular sign plate 15 mounted upon the outer race.

The inner race is in the form of a sleeve adapted to be secured to the hollow bolt 7 by means of a second bolt 16 which passes freely through the sleeve and has a free end adapted for threading into the hollow bolt, with the head of the second bolt disposed on the outside.

A washer 17 is interposed between the head 7 and the inner end of the inner race, and a second washer 18 is interposed between the outer end of the inner race and the head of the second bolt, so that the inner race is firmly secured upon the hollow bolt when the bolt 16 is screwed home.

The outer race 13 is free to rotate on the ball race and has the sign plate 15 secured centrally thereon, by any suitable means, the plate being circular in form and corresponding in size substantially to the wheel opening. Its outer face may carry any desired advertizing matter, and it is held against rotation by one or more weights 19 mounted near the periphery thereof.

In use:

The anchoring means may remain permanently attached to the hub of the wheel and the sign assembly may be easily applied by merely threading the bolt 16 into the hollow bolt 7.

In order to maintain the sign plate assembly as an integral unit, even if removed, a nut 20 is threaded upon the free end of the bolt 16 and up against the washer 17. This nut may remain in place upon installation, as shown in Figure 2.

When the sign assembly is removed, a simple bolt 21 may be screwed into the outer end of the hollow bolt 7, the bolt 21 having a suitable decorative head or flange 22 to cover the bolt 7 and to present an artistic appearance.

I claim:

1. In an advertizing attachment for an automobile wheel having a hub cap with an axial hole therein, an anchoring means comprising an outer and an inner disc disposed on opposite sides of the hub cap and having central apertures registering with and co-extensive with the hole in the hub cap, a hollow, internally threaded, bolt extending through the apertures and the hole and having a head bearing on the outer disc, and a nut threaded on the bolt to bear on the inner disc and operable for tightening the discs upon the cap, the inside of the hollow bolt being unobstructed to serve as an anchoring means for a threaded attachment.

2. In an advertizing attachment for an automobile wheel having a hub cap with an axial hole therein, an anchoring means comprising an outer and inner disc disposed on opposite sides of the hub cap and having central apertures registering with and co-extensive with the hole in the hub cap, a hollow internally threaded bolt extending through the apertures and the hole and having a head bearing on the outer disc, a nut threaded on the bolt to bear on the inner disc and operable for tightening the disc upon the cap while leaving the inside of the bolt unobstructed, a bearing support having an axial extension threaded into the hollow bolt, and an annular plate revolvable on the bearing support and adapted to carry advertizing matter on the outer surface thereof.

3. In an advertizing attachment for an automobile wheel having a hub cap with an axial hole therein, an anchoring means comprising an outer and an inner disc disposed on opposite sides of the hub cap and having central apertures registering with and co-extensive with the hole in the hub cap, a hollow internally threaded bolt extending through the apertures and the hole and having a head bearing on the outer disc, a nut threaded on the bolt to bear on the inner disc and operable for tightening the discs upon the cap while leaving the inside of the bolt unobstructed, a bearing support having an axial extension threaded into the hollow bolt, and an annular plate revolvable on the bearing support and adapted to carry advertizing matter on the outer surface thereof, the bearing support and the plate having cooperative means for holding the plate against axial movement on the bearing support so as to allow the bearing support and the plate to be removed from the hollow bolt as a unitary structure.

References Cited in the file of this patent

UNITED STATES PATENTS

| | | |
|---|---|---|
| 2,014,058 | Tonai | Sept. 10, 1935 |
| 2,111,015 | Walker | Mar. 15, 1938 |
| 2,130,220 | Ball et al. | Sept. 13, 1938 |
| 2,169,237 | Gasco | Aug. 15, 1939 |
| 2,650,862 | Lyon | Sept. 1, 1953 |
| 2,754,154 | Solow | July 10, 1956 |